United States Patent [19]
Chase et al.

[11] 4,291,095
[45] Sep. 22, 1981

[54] COATING COMPOSITION FOR GLASS FIBERS

[75] Inventors: Kenneth P. Chase, Newark; Dale E. McCoy, Granville, both of Ohio

[73] Assignee: Owens-Corning Fiberglass Corporation, Toledo, Ohio

[21] Appl. No.: 20,779

[22] Filed: Mar. 15, 1979

Related U.S. Application Data

[63] Continuation-in-part of Ser. No. 821,379, Aug. 3, 1977, abandoned.

[51] Int. Cl.³ ..................... C08L 27/14; D02G 3/00
[52] U.S. Cl. ......................... 428/391; 260/29.6 RW; 260/29.6 Z; 260/29.7 D; 260/29.7 NR; 260/29.7 W; 428/392; 427/386; 427/387; 260/29.7 SQ
[58] Field of Search ............... 428/375, 378, 391, 392, 428/268, 429; 260/29.6 RW, 29.6 Z, 29.7 W, 29.7 NR, 29.7 D, 29.7 SQ; 427/386, 387, 389.8

[56] References Cited

U.S. PATENT DOCUMENTS

| | | | |
|---|---|---|---|
| 2,686,737 | 8/1954 | Caroselli | 428/268 |
| 2,722,488 | 11/1955 | Lawsberg | 428/268 |
| 2,955,053 | 10/1960 | Roth | 428/268 |
| 3,108,897 | 10/1963 | Hamiter et al. | 428/268 |
| 3,364,059 | 1/1968 | Marzocchi | 428/391 |
| 3,589,934 | 6/1971 | Schimmel | 428/268 |
| 3,591,408 | 7/1971 | Marzocchi et al. | 428/268 |
| 3,654,056 | 4/1972 | Nisbet et al. | 428/268 |
| 3,816,235 | 6/1974 | Lin | 428/392 X |
| 3,924,046 | 12/1975 | Ribka et al. | 428/392 X |
| 4,009,136 | 2/1977 | Lewandowski et al. | 260/29.7 W |

*Primary Examiner*—Lorraine T. Kendell
*Attorney, Agent, or Firm*—Ronald C. Hudgens; Philip R. Cloutier; James B. Wilkens

[57] ABSTRACT

Disclosed is a coloring agent-containing coating composition comprising a film-forming latex polymer, an epoxy-functional silane, an acid-functional latex polymer, a mercapto-functional silane, and a cationic dye. Such coating compositions are particularly suited for coating onto glass fibers.

9 Claims, No Drawings

COATING COMPOSITION FOR GLASS FIBERS

CROSS REFERENCE TO RELATED APPLICATIONS

This application is a continuation-in-part of application Ser. No. 821,379, filed Aug. 3, 1977, now abandoned.

TECHNICAL FIELD

The present invention relates to coloring agent-containing coating compositions and more particularly to improved coating compositions which are resistant to bleeding, washing, and abrasion. Coloring agent-containing coating compositions normally are compounded from a binder phase and a coloring agent or colorant phase. The coating compositions preferably are applied to glass fibers, though they may be used on plastics, textiles, paper, glass, wood, and the like.

DISCLOSURE OF THE INVENTION

The present invention is for a novel coloring agent-containing coating composition which is dispersed in water. Such coating composition comprises an aqueous dispersion, a film-forming elastomeric latex polymer, an epoxy-functional silane, and a coloring agent comprising an acid-functional latex polymer, a mercapto-functional silane, and a cationic dye. Another aspect of the present invention is a siliceous glass substrate having coated thereon the cured coating composition described above. A further aspect of the invention is a method for imparting color to glass fibers, which method comprises coating glass fibers with the aqueous coating composition of this invention.

BEST MODE FOR CARRYING OUT THE INVENTION

The novel coating composition is composed of a binder phase which includes a film-forming elastomeric latex polymer and an epoxy-functional silane, and a coloring agent composition of an acid-functional latex polymer, a mercapto-functional silane, and a basic or cationic dye. It must be realized, though, that interaction between these phases may occur including chemical reactions between certain of the components of the two phases. For clarity and ease of description, the ingredients will be categorized by the listed phases, though this is not a limitation of the present invention.

Referring to the film-forming elastomeric latex polymers, preferably such latex elastomers are soft and flexible for providing a soft hand quality to the product coated fabrics. The latex elastomers are conventional in composition and can be non-ionic, cationic, or anionic as is necessary, desirable, or convenient in compounding the novel coating compositions. Such latex elastomers also typically have a relatively low glass transition temperature ($T_g$). The preferred latex elastomers are thermosetting by being self-cross-linking, though use of cross-linking agents (e.g., melamine or the like) is acceptable. Preferable latex elastomers are acrylic polymers, copolymers, and interpolymers formulated from acrylic and substituted acrylic monomers. Suitable commercially available latex elastomers include RHOPLEX TR-485 and E-1126, such latices being available from Rohm & Haas Company. The proprotion of latex elastomer typically is between about 10 to 60 percent by weight of the aqueous coating composition on a non-volatile solids basis.

A particularly suitable epoxy-functional silane is gamma-glycidoxypropyl trimethoxy silane, available from Union Carbide under the trade designation "A-187". Other tri(alkoxy) silanes containing a reactive oxirane group may be used in the novel aqueous coating composition of the present invention. It has been determined that particularly good crocking properties are obtained by the combination of the epoxy silane and latex elastomer of the novel coating composition. Typically, the proportion of epoxy silane is relatively small and ranges from about 0.4 to about 10 percent by weight of the coating composition on a non-volatile solids basis.

Referring to the coloring agent composition or colorant, the preferred acid-functional or acidic latex polymers are acrylic polymers and copolymers made by the addition polymerization of a mixture of ethylenically-unsaturated monomers employing conventional free radical catalysts. The acid groups may be introduced into the acidic latex polymer by inclusion of acid-functional monomers in the monomer mix used to synthesize the acidic latex polymer. Typical acid-functional monomers include $\alpha$-, $\beta$- ethylenically unsaturated carboxylic acids such as, for example, acrylic acid, methacrylic acid, itaconic acid, maleic acid including maleic anhydride for present purposes, and the like and mixtures thereof. Additionally, ethylenically unsaturated sulfonic acids may be used to introduce the acid functionality into the acidic latex polymer. Representative examples of ethylenically unsaturated sulfonic acids include, for example, vinyl sulfonic acid, 2-sulfoethylmethacrylate, and the like and mixtures thereof. Preferably, the acidic monomer is present in a sufficient proportion to give the resulting acidic latex polymer an effective equivalent weight of between about 100 and about 300 (effective equivalent weight being defined as the grams of the acidic latex polymer per gram-equivalent of acid groups). Additional monomers which may be used to formulate the acidic latex polymers include, for example, copolymerizable olefins, lower alkanol esters of acrylic and substituted acrylic acids, acrylonitrile, styrene and substituted styrenes, vinyl acetate and the like and mixtures thereof. A copolymer formulated from methacrylic acid and acrylic acid (a 75:25 weight ratio, respectively) has been found to provide good bleed resistance to the novel aqueous coating composition of the present invention.

Suitable acidic latex polymers for use in the invention also may be obtained commercially and representative examples of such commercially available acidic latex polymers include certain of the ACRYSOL latices manufactured by Rohm & Haas. A description of some of the ACRYSOL latices follows.

"Acrysol" ASE 108 is a anionic, acrylic polymer latex which contains acidic functional groups and has a pH of 2.9, a Brookfield LVF viscosity at 25° C. (#1 spindle, 12 rpm) of 200 cps., an effective equivalent weight of polymer solids of 124 and a solids content of 20%.

"Acrysol" ASE 60 is an anionic, acrylic polymer latex which contains acidic functional groups and has a pH of 3.5, a Brookfield LVF viscosity at 25° C. (#1 spindle, 12 rpm) of 4 cps., an effective equivalent weight of polymer solids of 218 and a solids content of 28%.

"Acrysol" ASE 75 is an anionic, acrylic polymer latex which contains acidic functional groups and has a pH of 3.0, a Brookfield LVF viscosity at 25° C. (#1 spindle, 12 rpm) of 20 cps., an effective equivalent weight of polymer solids of 266 and a solids content of 40%.

"Acrysol" ASE 95 is an anionic, acrylic polymer latex which contains acidic functional groups and has a pH of 3.3, a Brookfield LVF viscosity at 25° C. (190 1 spindle, 12 rpm) of 50 cps., an effective equivalent weight of polymer solids of 124 and a solids content of 20%.

A proportion of acidic latex polymer in the novel aqueous coating composition typically ranges from between about 4 and 40 percent by weight of the composition on a non-volatile solids basis.

The dye is a basic or cationic dye conventionally used in coatings of the type described in this application. Particularly suitable cationic dyes include the SEVRON dyes commercially available from E. I. duPont de Nemours and Company, and the BASACRYL dyes commercially available from BASF Corporation. Dyes containing amino groups, quaternary ammonium groups, or the like typically provide the cationic or basic functionality of the dyes which may be suitably employed in the present invention. The proportion of cationic dye typically ranges from about 0.4 to about 20 percent by weight of the coating composition on a non-volatile solids basis.

The preferred mercaptosilanes have terminally-substituted mercaptoalkyl groups of 3 to 6 carbon atoms and contain hydrolyzable lower alkoxy groups, such as methoxy, ethoxy, methoxyethoxy, acetoxy, etc. Mercaptoalkyltrialkoxy silanes are particularly advantageous for complexing basic dyes to form leach-resistant coatings. Suitable mercapto-functional silanes are designated "A-189", available from Union Carbide and "Z-6062", available from Dow Corning. "A-189" and "Z-6062" are both gamma-mercaptopropyltrimethoxysilane. The combination of epoxy-functional silane with mercapto-functional silane is effective in promoting adhesion of the polymer to glass substrates. The silane compound, such as glycidyl-substituted tri(alkoxy) silanes, can couple the polymer to the glass surface and enhance cross-linking to provide a durable coating. The mercapto compound, such as terminally-substituted lower alkyl tri(alkoxy) silanes, is believed to provide anti-oxidant properties as well as complexing of the dye component. The mercaptosilanes are believed to interact with the dyestuff in a unique manner to render the cured coatings resistant to washing and abrasion. The proportion of mercaptosilane usually ranges from about 0.4 to about 20 percent by weight of the coating composition on a non-volatile solids basis.

In practicing the present invention, the coloring agent can be mixed separately and incorporated into the aqueous coating composition as a premixed coloring agent. Alternatively, all ingredients of the composition may be added separately to formulate the coating composition. The novel coating composition may contain as much as 90 percent water, though this is uneconomical in commercial practice, to as little as about 10 percent water depending upon the viscosity of the resulting composition for good application. Typically, the composition will contain from about 40 to about 60 percent by weight water and retain requisite application viscosity. Also, conventional additives may be incorporated into the composition such as, for example, ultra-violet absorbers and anti-oxidants.

Excellent resistance to leaching of the color by boiling water is observed for cured films of the composition on glass surfaces. It is believed that the silane components of the composition hydrolyze to form an intermediate trihydroxyl silane coupling group, which group is weakly acidic and aids in promoting leaching resistance by insolubilizing the basic dye component of the composition.

The acidic latex polymers of the type described herein often have physical properties which do not permit a continuous film of such polymers to be deposited on a glass substrate. Significant amounts of acid groups tend to raise the glass transition temperature of these polymers. The resulting relative stiffness of such high modulus acidic polymers is overcome by the latex elastomers of the composition. By incorporating the film-forming elastomeric polymer having a lower modulus of elasticity than the usually brittle acid polymer, good physical properties as well as good coloring properties are obtained. It is believed that the dyed acid polymers are present as discrete particles or discontinuous deposits imbedded in the continuous phase binder of latex elastomer. Thus, the physical and chemical properties of the composition are controlled by the latex elastomer, which has a relatively low glass transition temperature and provides a soft hand quality to the resulting coated fabrics. It should be noted that the latex elastomer can be omitted from the coating composition and the remaining ingredients coated onto the glass substrate and the deposited film dried. Subsequently, the latex elastomer can be applied or topcoated in a separate finishing step, as will be demonstrated in the examples which follow.

The coating composition preferably is applied to any glass substrate, such as fibers conventionally employed to produce textile fabrics. The glass substrate may be composed of alkali silicates, alumino-silicates, borosilicates, and like siliceous materials. The glass substrate may be coated by conventional application methods to obtain a cured dry film of adherent colored polymer deposited thereon. Preferably, the coating composition is applied to the glass fiber substrate after formation of such fiber substrate, that is, to glass fabric which has been heat cleaned or scoured. The coating composition may be applied by a dipping process conventionally used in this art. The cured coating on the glass substrate typically has a solids content ranging from about 0.5 to about 10 percent by weight of the fabric (as determined by loss on ignition).

The following examples demonstrate how the present invention can be practiced, but should not be construed as limiting the invention. In this application, all units are in the metric system and all parts in percentages are by weight, unless otherwise expressly indicated.

EXAMPLES

EXAMPLE I

A coloring agent composition was formulated by adding the following ingredients in their listed order to a mixing vessel at room temperature with stirring: about 90 parts by weight of "Acrysol" ASE 108 acid-functional acrylic polymer latex, about 5 parts of Union Carbide's A-189 mercaptosilane, and about 5 parts of duPont's "Sevron" Brilliant Red 4G cationic dye. The resulting coloring agent can be incorporated with an epoxy silane and latex elastomer to make a suitable coating composition of this invention.

EXAMPLE II

A coloring agent-containing coating composition was formulated by adding about 76.5 parts of demineralized water and about 1 weight percent of acetic acid to a mixing vessel with stirring at room temperature. About 1 part of gamma-mercaptopropyltrimethoxy silane (Union Carbide's A-189) was added to the mixing vessel followed by the addition of about 1 part of duPont's "Sevron" Brilliant Red 4G cationic dye and the resulting mixture stirred until the dye was evenly dispersed.

To the mixing vessel then was added about 5 parts of Rohm & Haas' "Acrysol" ASE 108 acidic functional acrylic polymer latex and the stirring continued for about five minutes. Then about 15 parts of Rohm & Haas' "Rhoplex" E-1126 film-forming latex polymer was added to the contents of the mixing vessel while stirring continued. Finally, about 0.5 parts of gamma-glycidoxypropyl tri-methoxy silane (Union Carbide's A-187) was added to the contents of the mixing vessel and the contents stirred for about 30 minutes to produce the composition of this invention.

EXAMPLE III

The coating composition of Example II was applied to scoured glass fiber fabric (scoured in a 1 percent acetic acid bath for about 10 minutes) using a conventional dipping process. The resulting coated fabric was observed and found to have a fairly even brilliant red color.

EXAMPLE IV

The procedure of Examples II and III was repeated except that about 1.6 parts of duPont's "Sevron" Blue NF dye was employed as the dye for the composition. Similar results as reported above were found for such blue dye-containing composition.

EXAMPLES V–VII

Coloring agent compositions were made according to the procedure of Example I, except that the dyed polymeric composition was prepared by heating 10 parts by weight of three different acrylic latices with 90 parts of demineralized water, 1 part of gamma-mercaptopropyltrimethoxy silane (A-189), and 1 part of "Sevron" Red 4G basic dye. The three different acidic latices used were Rohm & Haas' "Acrysol" "ASE-60", "ASE-75" and "ASE-90". Each of these mixtures was boiled and cooled to obtain stable coloring agents for incorporation into the coating compositions of this invention.

EXAMPLES VIII–XI

The procedure of Examples I and V–VII were repeated using "Sevron" Yellow 8GMF dye with 1 part of isopropanol. The darkest yellow colors were obtained using the "ASE-95" and "ASE-108" acrylic latices.

EXAMPLE XII

A two-step coating method was employed to deposit the coating composition. A first mixture was made by adding 100 parts of "Acrysol" ASE-95 latex (10% non-volatile solids) and 1 part of "Sevron" Yellow 8GMF dye to a mixing vessel. The contents of the vessel were heated to boiling and then cooled with stirring to form a stable dyed polymer dispersion. This dispersion then was mixed with an equal amount of 1 percent aqueous Kelzan D thickener.

A second aqueous mixture containing 1 percent A-189 mercaptosilane was hydrolyzed with 1 percent acetic acid, to which was added 1 percent of "Sevron" Red 4G dye (50% solids) to form an opaque red sol upon sitting. To the first dyed polymeric mixture was added 40 parts of the second dyed mixture to obtain a first coating composition. This coating was deposited upon a siliceous glass substrate as a cast film and dried at 100° C. to form a discontinuous phase of cured, dyed polymeric particles.

A second aqueous coating composition containing 20 percent of Rohm & Haas' Rhoplex E-1126 film-forming elastomeric polymer latex and about 1 percent A-187 epoxy silane was topcoated onto some of the glass substrate containing the discontinuous phase cured, dyed polymeric particles. The two polymeric compositions were present in the cured coating at approximately equal proportions by weight to give a total film thickness of about 0.5 mm.

The substrates coated only with the first coating composition were easily stripped of the coating showing poor adhesion of the coating to the glass, and the colorant leached by a hot detergent mixture (0.1 percent Tide detergent at 80° C. for 10 minutes). By contrast, the top coated substrate contained a coating which adhered well and was not leached by the same detergent washing.

We claim:

1. A coloring agent-containing coating composition comprising in aqueous dispersion: a film-forming elastomeric latex polymer, an epoxy-functional silane, and a coloring agent comprising an acid-functional latex polymer, a mercapto-functional silane, and a cationic dye.

2. The composition of claim 1 wherein said epoxy-functional silane ranges from about 0.4 to about 10 percent by weight on a non-volatile solids basis.

3. The aqueous coating composition of claim 1 wherein said elastomeric latex polymer ranges from about 10 to about 60 percent by weight on a non-volatile solids basis.

4. The aqueous coating composition of claim 1 wherein said acid-functional latex polymer ranges from about 4 to about 40 percent by weight on a non-volatile solids basis.

5. The aqueous coating composition of claim 1 wherein said mercapto-functional silane ranges from about 0.4 to about 20 percent by weight on a non-volatile solids basis.

6. The aqueous coating composition of claim 1 wherein said dye ranges from about 0.4 to about 20 percent by weight on a non-volatile solids basis.

7. The aqueous coating composition of claim 1 wherein said epoxy-functional silane comprises gamma-glycidoxypropyl trimethoxy silane and said mercapto-functional silane comprises gamma-mercaptopropyl-trimethoxy silane.

8. A glass fiber substrate at least a portion of the surface of which is coated with a coating of the cured aqueous coating composition of claim 1.

9. A method for imparting color to a glass fiber substrate which comprises coating said substrate with the aqueous coating composition of claim 1 and curing said coating composition.

* * * * *

UNITED STATES PATENT AND TRADEMARK OFFICE
CERTIFICATE OF CORRECTION

PATENT NO. : 4,291,095
DATED : September 22, 1981
INVENTOR(S) : KENNETH P. CHASE and DALE E. McCOY It is certified that error appears in the above-identified patent and that said Letters Patent are hereby corrected as shown below:

Column 3, line 7 should read:

pH of 3.3, a Brookfield LVF viscosity at $25^\circ$ C. (#1

Signed and Sealed this

Nineteenth Day of January 1982

[SEAL]

Attest:

GERALD J. MOSSINGHOFF

Attesting Officer — Commissioner of Patents and Trademarks